United States Patent [19]
Schambre et al.

[11] Patent Number: 6,113,483
[45] Date of Patent: Sep. 5, 2000

[54] VARIABLE MODE AIR DISTRIBUTION SYSTEM

[75] Inventors: John Schambre, Canton; Raymond C. Deyonker, Wixom; Joseph P. Holland, Farmington Hills; Marcus G. Washington, Detroit; Michael O. Forker, Novi; Dwight S. Brooks, New Boston; Sandeep Modi, Southfield, all of Mich.

[73] Assignee: DaimlerChrysler Corporation, Mich.

[21] Appl. No.: 09/252,056

[22] Filed: Feb. 17, 1999

[51] Int. Cl.[7] ........................................... B60S 1/54
[52] U.S. Cl. .............................................. 454/121
[58] Field of Search ........................... 454/121; 165/204, 165/203; 137/625.47, 876, 887, 883; 239/436, 443, 562, 581.1

[56] References Cited

U.S. PATENT DOCUMENTS

| | | |
|---|---|---|
| 1,153,778 | 9/1915 | Gibbs . |
| 3,190,584 | 6/1965 | Gire et al. . |
| 3,659,515 | 5/1972 | Galaniuk . |
| 4,574,842 | 3/1986 | Cordova . |
| 5,009,392 | 4/1991 | Ostrand .................................. 251/180 |
| 5,062,352 | 11/1991 | Ostrand . |
| 5,350,335 | 9/1994 | Andersson .............................. 454/121 |
| 5,366,408 | 11/1994 | Andersson .............................. 454/121 |
| 5,399,120 | 3/1995 | Burns et al. . |
| 5,676,595 | 10/1997 | Sumiya et al. . |
| 5,979,492 | 11/1999 | Miller ..................................... 137/426 |

*Primary Examiner*—Denise L. Ferensic
*Assistant Examiner*—Andrea M. Joyce
*Attorney, Agent, or Firm*—Marc Lorelli

[57] ABSTRACT

An air distribution system having a plurality of vents for a motor vehicle is provided. The system includes a cylindrical housing having a plurality of passageways that lead to the vents attached thereto, The cylindrical housing encloses two inner barrels are rotatably mounted therein that can independently direct air to selected vents. This provides the ability for the passenger of the vehicle to receive air flow through a selected vent and the driver to receive sir flow through a possibly different selected vent.

20 Claims, 6 Drawing Sheets

VARIABLE MODE AIR DISTRIBUTION SYSTEM

BACKGROUND OF THE INVENTION

1. Technical Field

The present invention generally relates to fluid distribution systems. More particularly, the present invention relates to an air distribution system for a motor vehicle that provides a cylindrical distribution chamber. More specifically, but without restriction to the particular embodiment and/or use which is shown and described for purposes of illustration, the present invention relates to an air distribution system for a motor vehicle that can provide different modes of operation to different sections of the vehicle.

2. Discussion

Ventilation systems for automotive vehicles typically include a distribution center to which air is supplied after being conditioned by a heating element, cooling element, or a combination thereof. The distribution center usually consists of an oblong box-like structure that includes a plurality of doors. The doors are attached to a plurality of ducts that promulgate throughout the instrument panel of a vehicle and ultimately to vents that are disposed to direct air flow into the vehicle cabin in directions desired by the operator of the vehicle. Air is forced thought the conditioning elements and into the distribution system by a blower. An operator can typically control the speed of the blower, or in the more advanced systems the blower as well as the conditioning elements are electronically controlled to establish a predetermined temperature within the vehicle cabin. The doors of the distribution center open and close by the command of the operator of the vehicle and are used to provide an air distribution system with a plurality of modes. For a typical vehicle the modes consist of panel, defrost, floor, and some combinations thereof. The doors typically open into the distribution center itself. Consequently, the distribution center is large and bulky to provide the necessary room for opening and closing the plurality of doors.

The use of doors and a generally box-like distribution center create a considerable amount of turbulence into the air flow. The doors tend to disturb the stream line of the flow and the box-like structure requires a tremendous amount of mixing and eddy currents in order to direct the flow to the open door or doors. This increase in the turbulent character of the flow may lead to vibration of the doors and other accessory components, which can produce a significant amount of undesired noise to enter the vehicle cabin.

There is a need to provide a smaller and more compact distribution center. There continues to be a need to provide a distribution system with a more streamlined or laminar-like flow profile to reduce the amount of noise originating from the distribution center. There also is a need to provide possibly a different mode to both the driver and passenger of a vehicle. For example, the driver may prefer to direct air into the panel vents on his/her side of the vehicle and the passenger may prefer limit air completely or direct air to the floor on his/her side of the vehicle.

SUMMARY OF THE INVENTION

Accordingly, it is a principal objective of the present invention to provide a truly versatile and effective distribution center for the ventilation system of a motor vehicle.

It is another objective of the present invention to provide a small and compact system for distributing air in a motor vehicle.

It is still another objective of the present invention to provide a distribution system that allows for dual mode control. For example, the driver may prefer to direct air into the panel vents on his/her side of the vehicle and the passenger may prefer limit air completely or direct air to the floor on his/her side of the vehicle.

It is a further objective of the present invention to provide a distribution system that limits the amount of turbulence that is introduced to the flow stream. This will reduce the amount of noise that is introduced into the passenger cabin from the ventilation system of the vehicle.

In one form, the present invention provides an air distribution system having a defroster vent, a panel vent, a floor vent, and a rear passenger vent. The air distribution system also includes a cylindrical housing having a plurality of passageways or ducts attached thereto. The passageways lead to the aforementioned vents and can be classified as driver passageways directed to a first portion of the vehicle and passenger passageways directed to a second portion of the vehicle. The cylindrical housing has a open end and a closed end, the blower is disposed such that air is forced into the cylindrical housing through said open end and towards said closed end. The housing contains two inner barrels, a driver's inner barrel and a passenger's inner barrel. Passenger's inner barrel is disposed adjacent to the open end of the cylindrical housing and includes an outer surface having slots thereon. The passenger's inner barrel includes an involute surface to direct air flow to said slots, and is rotatably disposed within the cylindrical housing so as to selectively align the slots with the passageways directed to the second portion of the vehicle. The alignment or misalignment of slots with the passageways will define a mode of operation such as defrost mode, panel mode, floor mode, or a combination thereof. A rod connects passenger's inner barrel to a control lever, such that rotational position of the barrel can be controlled by the position of the lever. Driver's inner barrel is disposed adjacent to the closed end of the cylindrical housing and includes an outer surface having apertures thereon. The driver's inner barrel includes an involute surface to direct air flow to said apertures, and is rotatably disposed within the cylindrical housing so as to selectively align the slots with the passageways directed to the first portion of the vehicle. The alignment or misalignment of the apertures with the passageways will define a mode of operation such as defrost mode, panel mode, floor mode, or a combination thereof. Driver's inner barrel is connected directly to a driver's control lever, such that rotational position of the barrel can be controlled by the position of the lever. In this arrangement, the first portion of the vehicle may experience a mode of operation different from that experienced by the second portion of the vehicle.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
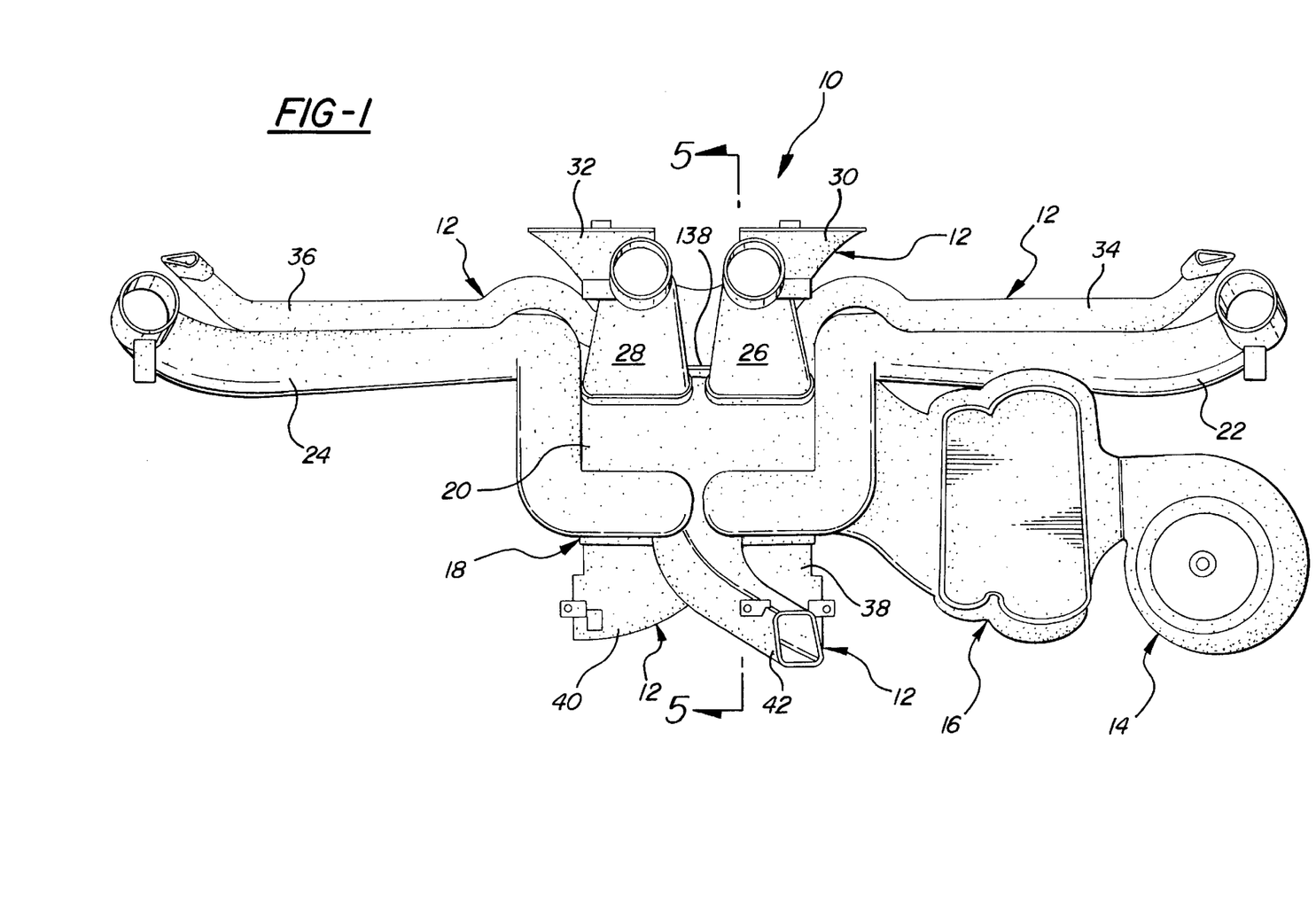
FIG. 1 is a perspective view of an air distribution system.

Referring to the drawings, FIG. 1 illustrates an air distribution system 10. Distribution system 10 is utilized to distribute air or any other type of fluid to selected passageways 12. The exemplary embodiment of the present invention is used in a motor vehicle to distribute air to various portions of the vehicle. Air is introduced to blower or pump 14. Blower 14 initiates air flow through conditioning system 16 and into the central portion 18 of the distribution system 10. Central portion includes a cylindrical housing 20 to which passageways 12 are connected. Passageways 12 include a right panel duct 22, a left panel duct 24, a right central panel duct 26, a left central panel duct 28, a right defrost duct 30, a left defrost duct 32, a right demister duct 34, a left demister duct 36, a right floor duct 38, a left floor duct 40, and a rear duct 42. One can appreciate that the above ducts can be classified into two groups, a first group 22, 26, 30, 34 directed towards the right, and a second group 24, 28, 32, 36 directed towards the left when viewing the figure. Rear duct 42 may be classified in either group.

Figure 2:
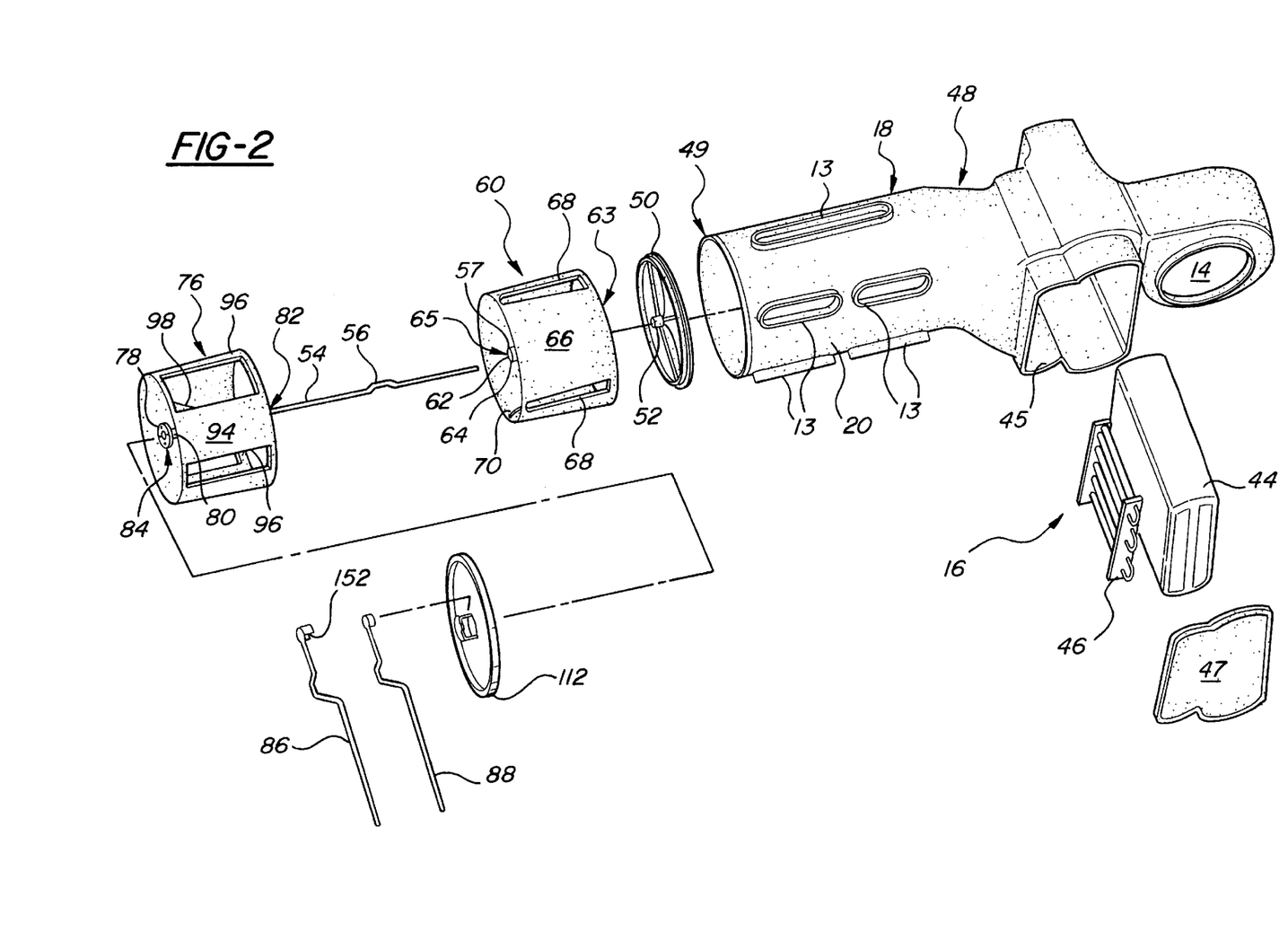
FIG. 2 is an exploded view of an air distribution system not including the plurality of passageways.

Turning to FIG. 2, an exploded view of the air distribution system 10 is provided not including passageways 12. Passageway attachment flanges 13 illustrate the location at which passageways 12 would attach to cylindrical housing 20. Blower 14 initiates air flow through conditioning system 16. Conditioning system 16 includes an evaporator core 44 and a heater core 46 disposed in series. The air flow is either cooled via evaporator core 44 or heated via heater core 46 depending on the preferences of the operator. The air flow, after having been properly conditioned, is forced into the central portion 18 of the air distribution system 10. Evaporator core 44 and heater core 46 are inserted into conditioning system 16 through opening 45. A cover 47 is provided to enclose evaporator core 44 and heater core 46. Cover 47 provides accessibility to evaporator core 44 and heater core 46 for maintenance.

Figure 3:
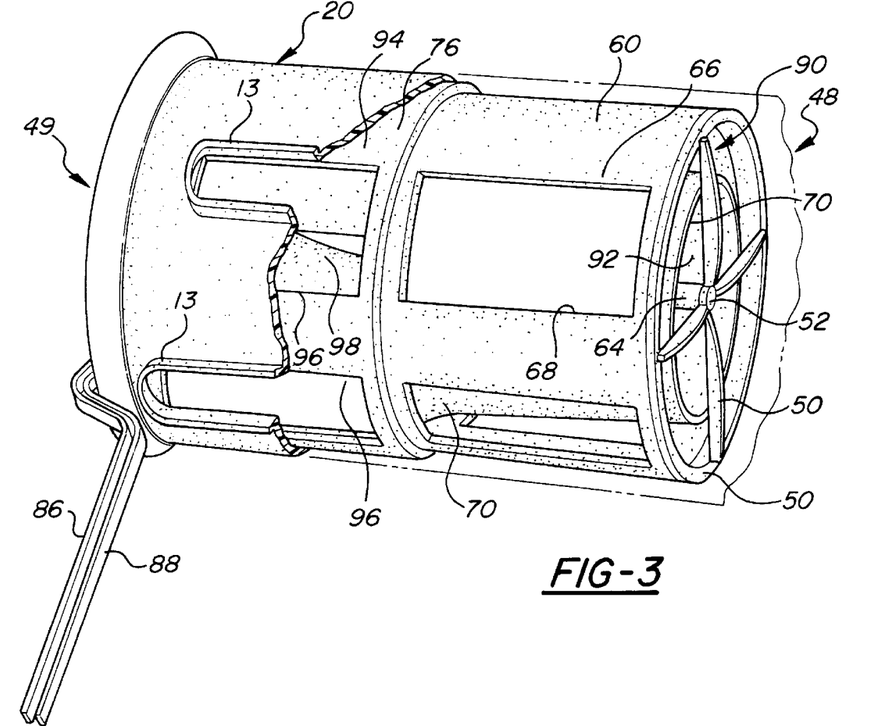
FIG. 3 is a perspective view of the central portion of an air distribution system not including the plurality of passageways and with a portion of the cylindrical housing cut away.
Figure 4:
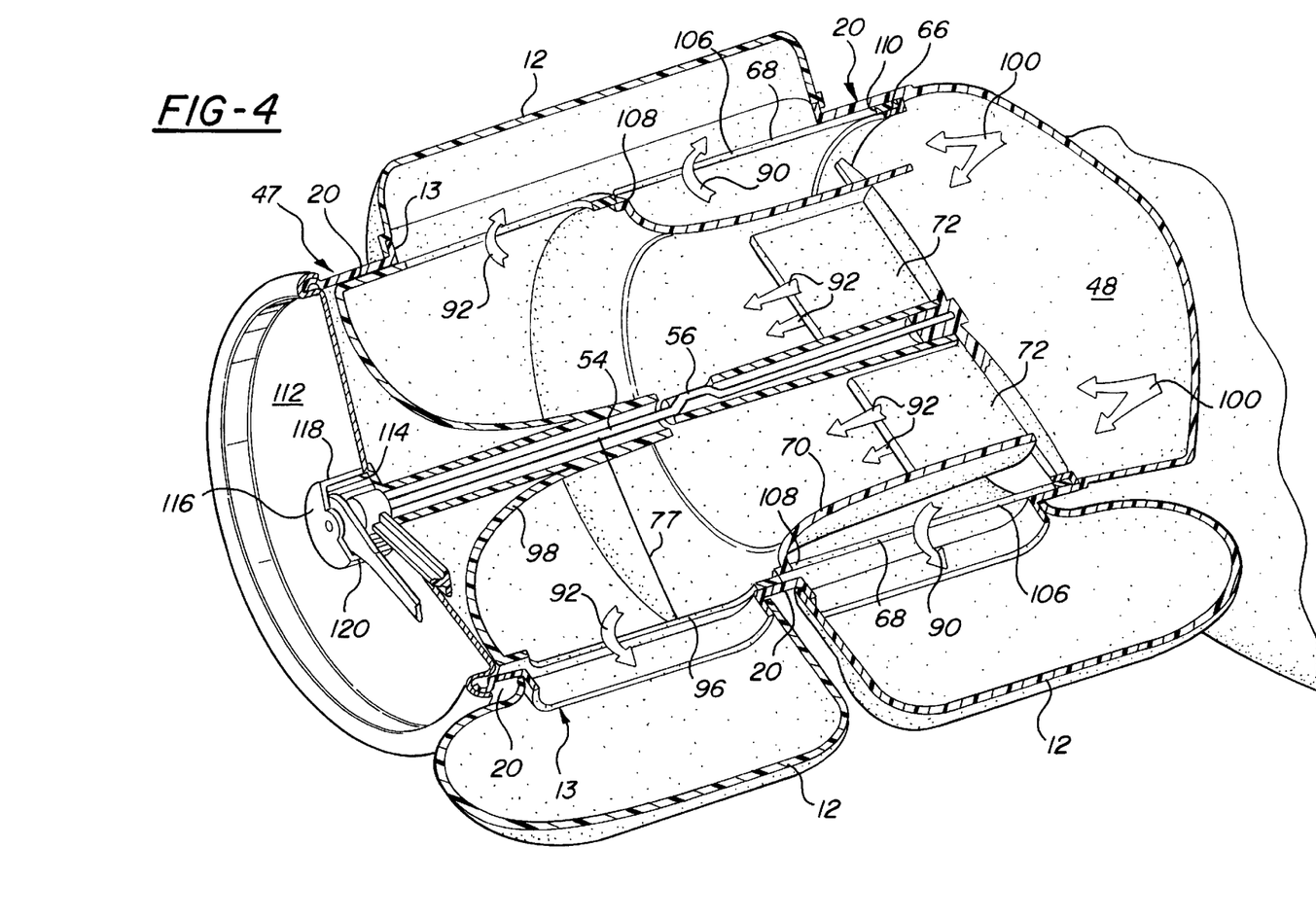
FIG. 4 is a cut away view of the central portion of an air distribution system.

A stationary ring 50 is press fit into cylindrical housing 20 near the open end 48 and includes a cup 52 disposed at the center thereof to receive a rod 54 and allow for rotation of rod 54 therein. Rod 54 includes a wedge 56 formed thereby to locate inner barrel 60 between wedge 56 and stationary ring 50. Inner barrel 60 has a bore 62 formed through the central formation 64 thereof for reception of rod 54. Rod 54 extends along the axis of housing 20. Central formation 64 abuts cup 52 at a first end 63 and contacts wedge 56 at a second end 65, as best seen in FIG. 3, to limit longitudinal movement thereof and to provide rotation of inner barrel 60 with rod 54. Wedge 56 fits into a groove 57 formed at the second end 65 of central formation 64. Inner barrel 60 has an outer surface 66 with slots 68 formed therein. Outer surface 66 has a first involute surface 70 attached thereto to direct air flow to slots 68. Central formation 64 is attached to first involute surface 66 by spokes 72, as best seen in FIG. 4. A second inner barrel 76 is disposed downstream from the first inner barrel 60. Second inner barrel 76 also includes an axial bore 78 formed through the central structure 80 thereof for reception of rod 54. Central structure 80 is formed adjacent to and along the axis of housing 20. Central structure 80 has a first end 82 that is adjacent to wedge 56 and a second end 84 that is attached to driver's lever 86 near the closed end 49 of the cylindrical housing 20. Second inner barrel 76 also includes an outer surface 94 with apertures 96 formed therein. Central structure 80 and outer surface 94 are connected by a second involute surface 98. Second inner barrel 76 is not positively attached to rod 54, so that it may be rotated independent of rod 54. Rod 54 is attached to passenger's lever 88 so that movement thereof with cause rod 54 to rotate, and in turn cause the first inner barrel 60 to rotate. This nested arrangement of levers will be discussed subsequently with reference to FIG. 4B. The closed end 49 of the cylindrical housing 20 is formed by end cap 112.

FIG. 3 shows an assembled view of the central portion 18 of the air distribution system 10. The cylindrical housing 20 is shown partially cut away to illustrate the first and second inner barrels 60, 76. Air enters the cylindrical housing 20 at open end 48 proceeds towards the closed end 49 of the cylindrical housing 20. The air flow entering open end 48 is separated into two portions. A portion 90 of the air flow is disposed radially outward of first involute surface 70. Portion 90 of the air flow is directed towards slots 68 by the first involute surface 70. The remaining portion 92 of the air flow is disposed radially inward of said first involute surface 70 and flows through first inner barrel 60 and into second inner barrel 76. The remaining portion 92 of the air flow is directed towards the apertures 96 on the outer surface 94 of the second inner barrel 76 by the second involute surface 98.

One can appreciate that the second inner barrel 76 can be rotated within the cylindrical housing 20 so as to align apertures 96 with selected passageways 12. One can also appreciate that first inner barrel 60 can be rotated independent of the second inner barrel 76 so as to align slots 68 with selected passageways 12 (not shown in FIG. 3 due to the cut-away view). The scheme of aligning the apertures 96 and slots 68 with the plurality of passageways 12 will be discussed subsequently with reference to FIGS. 5, 6, 7, 8, and 9.

Turning to FIG. 4, air flow, identified generally as arrows 100, is introduced into the cylindrical housing 20 thorough open end 48 in the direction of closed end 47. Air flow is introduced into the cylindrical housing in an axial direction. The first involute surface 70 of first inner barrel 60 effectively splits the air flow stream and directs a portion of the air flow, represented by arrows 90, towards slots 68. The air flow represented by arrows 90 is disposed radially outward from involute surface 70. Slot 68 is defined by side edges 106, forward edge 108, and rearward edge 110. The first involute 70 surface contacts rearward edge 110 and extends therefrom in the shape of a half of a parabola having a first multiple, for example $y=2.12\ x^2$. The first involute surface 70 is provided to direct the air flow in a streamlined manner to reduce the introduction of turbulence into the flow stream.

The remaining portion of the air, represented by arrows 92 flows through the first inner barrel 60, radially inward of first involute surface 70, and contacts second involute surface 98 and is directed towards apertures 96 in outer surface 94 of the second inner barrel 76. Second involute surface 98 contacts outer surface 94 and extends therefrom in the shape of half of a parabola having a second multiple, for example $y=1.22\ x^2$. In the exemplary embodiment, the second multiple is smaller that the first multiple associated with the first involute surface 70. Second involute surface 98 directs the remaining portion of the air flow in a streamlined manner, shown by arrows 92, to reduce the introduction of turbulence into the flow system. The second involute surface 98 interconnects outer surface 94 and central structure 80 of the second inner barrel thereby extending substantially the radius 77 of the second inner barrel 76.

Stationary ring 50 is illustrated in a press fit attachment to the cylindrical housing 20, the center of ring 50 includes a cup that acts as a bearing race to allow rod 54 to rotate therein. Wedge 56 contacts the central formation 64 and positions the first inner barrel 60 between wedge 56 and ring 50. Second inner barrel 76 is positioned between first inner barrel 60 and end cap 112. End cap 112 has a bore 114 formed in the center thereof. Bore 114 is partially covered by partial hollow cylinder 116 having a top stop 118 and a bottom stop 120. Both the top stop 118 and the bottom stop 120 limit rotation of the passenger's lever 88 and the driver's lever 86, and thereby limits the rotation of the first and second inner barrels, 60 and 76 respectively.

Figure 4B:
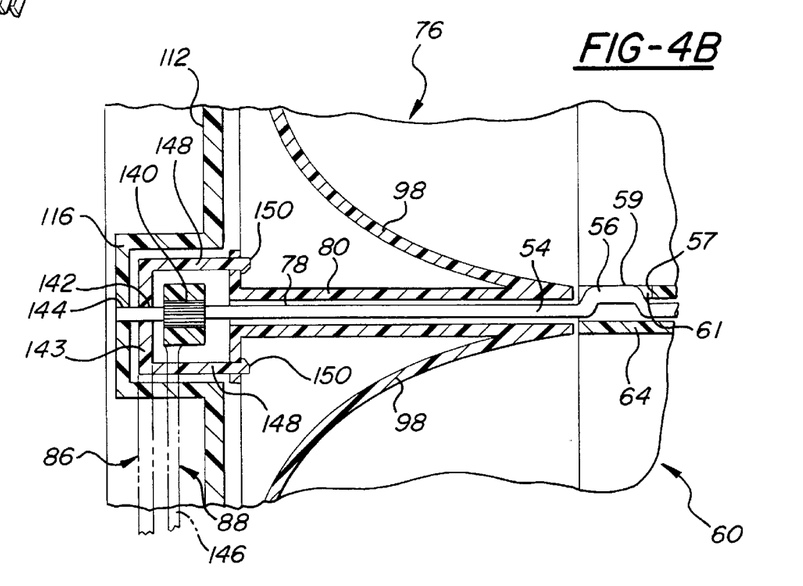
FIG. 4B is a magnified view of the area identified as 4b in FIG. 4.

The nested arrangement of the driver's lever 86 and the passenger's lever 88 is clearly illustrated in FIG. 4B. Rod 54 extends through passenger lever 88 and is coupled thereto at head portion 140. Rod 54 also extends though a bore 142 in the cap portion 143 of the driver's lever 86 and is not attached thereto, such that lever 86 and rod 54 are allowed to rotate freely independent of one another. Partial hollow cylinder 116 also has a bore 144 formed therein for reception of rod 54 such that rod 54 can rotate within bore 144. Passengers lever 88 has a fulcrum 146 attached to head portion 140 such that movement of fulcrum 146 will initiate rotation of the head portion 140, rod 54, and consequently first inner barrel 60. The cap portion 143 of the driver's lever 86 is hollow and larger than the head portion 140 of the passenger's lever 88 so as to produce a type of nested arrangement therebetween. The outer walls 148 of the cap portion 143 are mounted to the second inner barrel 76, preferably by clips 150. Cap portion 143 also includes a outer wall void 152, best seen in FIG. 2, which allows the fulcrum 146 of the passenger's lever to move unencumbered by the cap portion 143.

FIG. 4B also illustrates the wedge 56 and groove 57 contact. Groove 57 is formed by two longitudinally extending sides 59 and an end formation 61 interconnecting the two longitudinal sides 59. Only one side of the longitudinally extending sides 59 is shown in FIG. 4B due to the cross sectional view.

Groove 57 is adopted so that as wedge 56 rotates in one direction it contacts one of the longitudinally extending sides so that inner barrel 60 will rotate in a first direction. As the wedges rotates in the opposite direction, it contacts the other longitudinally extending side so that inner barrel 60 will rotate in a second direction, opposite the first direction. Wedge 56 contacts end formation 61 to limit the longitudinal movement of the first inner barrel 60.

Figure 5:
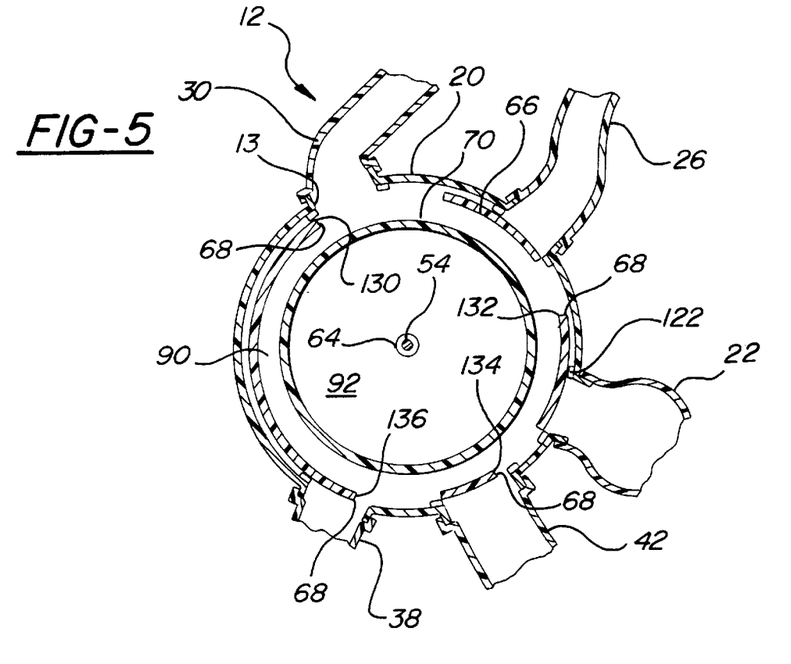
FIG. 5 is a cross sectional view of the central portion of an air distribution system along the line 5—5 of FIG. 1 with the air distribution system in the defrost mode.

FIG. 5 is a cross sectional view of the first inner barrel 60 in the defrost mode. It may be appreciated that the second inner barrel 76 has essentially the same general structure as the first inner barrel 76 excluding the shape of the second involute surface 98 as compared to the first involute surface 70. It can also be appreciated that the subsequent description of the first inner barrel 60 can be translated to describe the second inner barrel 76 and its aperture 96 arrangement as well. It may be understood, that by aligning slot 68 with one of the plurality of passageways 12, air will be allowed to flow into that passageway. In the exemplary embodiment, a foam seal 122 is disposed on the inner wall 124 of the cylindrical housing 20 circumferentially about each passageway 12 to provide a seal between the housing 20 and the outer surface 66 of the first inner barrel 60.

Figure 6:
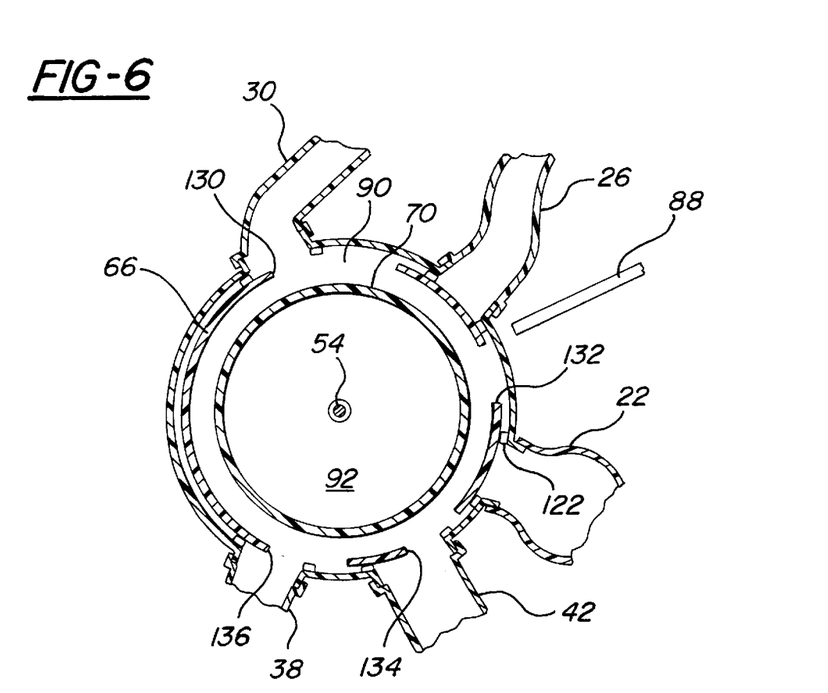
FIG. 6 is a cross sectional view of the central portion of an air distribution system along the line 5—5 of FIG. 1 with the air distribution system in the mixed mode.
Figures 8, 9:
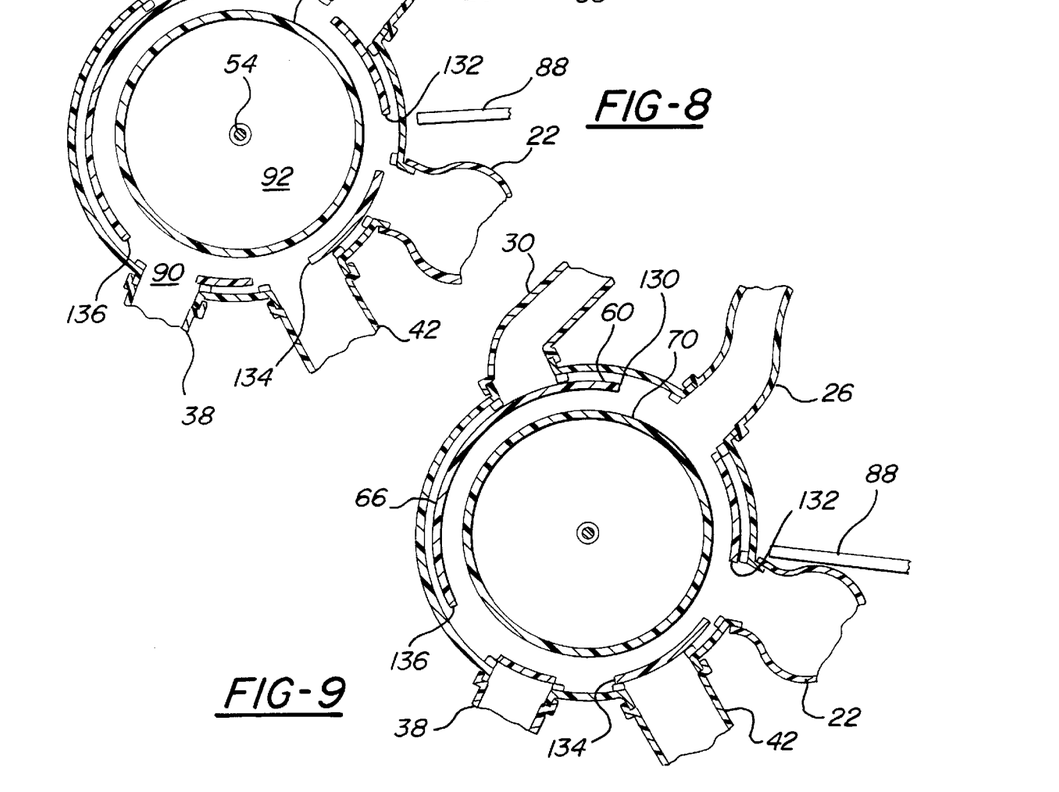
FIG. 8 is a cross sectional view of the central portion of an air distribution system along the line 5—5 of FIG. 1 with the air distribution system in the bi-level mode.
FIG. 9 is a cross sectional view of the central portion of an air distribution system along the line 5—5 of FIG. 1 with the air distribution system in the panel mode.

In one form, outer surface 66 of first inner barrel 60 has four slots 68. The first slot 130 allows air to flow to the right defroster duct 30 when in defrost mode, as illustrated in FIG. 5. The first slot 130, when in mixed mode as illustrated in FIG. 6, also substantially aligns with right defrost duct 30. The first slot 130 can also be rotationally positioned to align with the right center panel duct 26 while the system is in panel mode, as illustrated in FIG. 9. In all other modes of operation, the first slot 130 does not substantially align with any of the plurality of passageways 12.

The second slot 132 allows air to flow to the right panel duct 22 when the second slot 132 is aligned therewith. Such an alignment occurs when the system is in panel mode as illustrated in FIG. 9. One may appreciate that the second slot 132 aligns with the right panel duct 22 while the first slot 130 align with the right center panel duct 26, thereby defining the rotational position of the panel mode. In panel mode, the outer surface 66 of first inner barrel 60 blocks all other passageways 12 from receiving air flow from the central portion 18 of the air distribution system 10.

Figure 7:
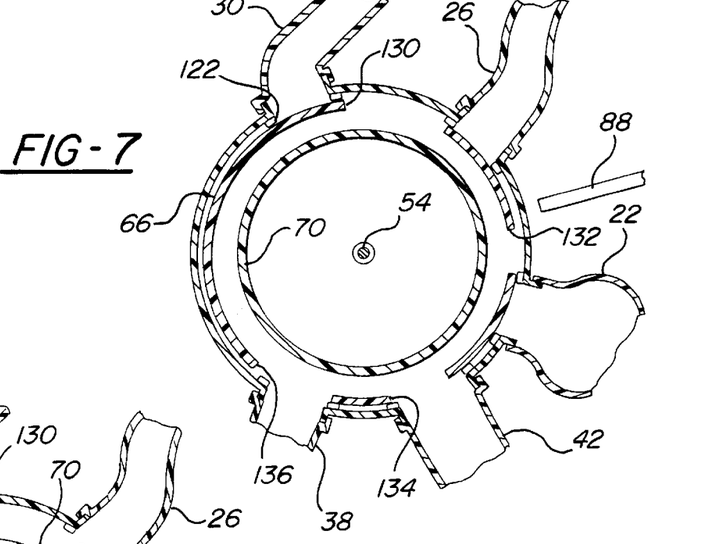
FIG. 7 is a cross sectional view of the central portion of an air distribution system along the line 5—5 of FIG. 1 with the air distribution system in the floor mode.

The third slot 134 substantially aligns with the rear duct 42 while in floor mode, as illustrated in FIG. 7, and bi-level mode, as illustrated in FIG. 8. In all other modes, rear duct 42 is substantially restricted by the outer surface 66 of the first inner barrel 60. The fourth slot substantially aligns with right floor duct 38 while in mixed mode, as illustrated in FIG. 6, in floor mode, as illustrated in FIG. 7, and in bi-level mode, as illustrated in FIG. 8. From this disclosure, it can be appreciated that many variances of the number of slots, the size of the slots, and the distance between the slots can be utilized to establish the desired function of the air distribution system. It should also be understood that the mode of operation is defined by the rotational position of the inner barrel 60 in conjunction with the slots 68 formed thereon, the distance between the slots 68, and the arrangement of passageways 12 attached to the cylindrical housing 20.

The rotational position of each inner barrel 60 and 76 can be changed independently of one another such that the passenger, via the passenger's lever 88, can select a rotational position of inner barrel 60 and thereby select a mode of operation for the right portion of the vehicle. The second inner barrel 76 can rotate independent of the first inner barrel 60 and thereby can establish a different rotational position and hence a different mode of operation for the left or driver's portion of the vehicle.

The exemplary embodiment provides for right defroster duct 30, right demister duct 34, left defroster duct 32, and left demister duct 36 to join cylindrical housing 20 at a single location 138, thereby proving some air flow to all four aforementioned ducts if only one inner barrel is in defrost or mixed mode. One may appreciate that selecting either defrost or mixed mode with both barrels, the amount of air flow the 4 ducts 32, 34, 36, and 38 will be higher than if only one of the barrels is in defrost or mixed mode.

While the above description constitutes the preferred embodiment of the invention, it will be appreciated that the invention is susceptible to modification, variation, and change without departing from the proper scope or fair meaning of the accompanying claims.

What is claimed is:

1. A fluid distribution system comprising:
   a housing having a plurality of passageways attached thereto adapted, said housing adapted to accept axial fluid flow; and
   an inner barrel disposed within said housing, said inner barrel comprising:
   an outer surface having a slot formed therein; and
   an involute surface carried by and extending from said outer surface to direct said axial fluid flow to said slot;
   said inner barrel rotatable within said housing, aligning said slot with one of said plurality of passageways to allow said fluid flow to be directed from said slot to one of said plurality of passageways.

2. A fluid distribution system comprising:
   a housing having a plurality of passageways attached thereto adapted to accept axial fluid flow; and
   an inner barrel disposed within said housing, said inner barrel comprising:
   an outer surface having a slot formed therein; and
   an involute surface carried by said outer surface to direct fluid flow to said slot;
   said inner barrel rotatable within said housing, thereby capable of aligning said slot with one of said plurality of passageways;
   wherein said involute surface includes a central structure formed adjacent to the axis of the housing and connected to said involute surface, said involute surface extending substantially the radius of said inner barrel.

3. The fluid distribution system as set forth in claim 1, wherein said involute surface is shaped substantially in the form of half a parabola so as to limit the introduction of turbulence to the fluid flow stream.

4. The fluid distribution system as set forth in claim 1, wherein said plurality of passageways extend from said housing initially in a direction substantially perpendicular to the axis of said housing.

5. A fluid distribution system having a pump to direct fluid flow into a air distribution center, said system comprising:
   a cylindrical housing having a plurality of passageways attached thereto;
   a first inner barrel rotatably disposed within said cylindrical housing, said first inner barrel having at least one slot formed on the outside surface thereof, said first inner barrel capable of aligning said slot with one of said plurality of passageways, said first inner barrel including a first involute surface to direct a first portion of the fluid flow to said at least one slot; and
   a second inner barrel rotatably disposed within said cylindrical housing independent of said first inner barrel, said second inner barrel having at least one aperture formed on the outside surface thereof, said second inner barrel capable of aligning said aperture with one of said plurality of passageways, said second inner barrel including a second involute surface, cooperative with said first involute surface, for directing a second portion of the fluid flow to said aperture.

6. The fluid distribution system as set forth in claim 5, wherein said first involute surface is shaped substantially in the form of half a parabola having a first multiple so as to limit the introduction of turbulence to the fluid flow stream.

7. The fluid distribution system as set forth in claim 6, wherein said second involute surface is shaped substantially in the form of half a parabola having a second multiple smaller than said first multiple.

8. The fluid distribution system as set forth in claim 5, wherein the ring of said fluid flow disposed radially outward of said first involute surface is guided through said slot by said first involute surface and the central portion of said fluid flow disposed radially inward of said first involute surface is guided through said aperture by said second involute surface.

9. The fluid distribution system as set forth in claim 5, wherein said at least one slot is cooperative with a first group of said plurality of passageways and said at least one aperture is cooperative with a second group of said plurality of passageways.

10. The fluid distribution system as set forth in claim 5, further comprising a rod coupled to said first inner barrel and a first lever attached to said rod for controlling the rotation of said first inner barrel.

11. The fluid distribution system as set forth in claim 10, further comprising a second lever attached to said second inner barrel for controlling the rotation thereof.

12. The fluid distribution system as set forth in claim 11, wherein said rod extends through a bore formed in the second inner barrel.

13. An air distribution system for distributing air in a vehicle through passageways directed towards a defroster vent, a panel vent, a floor vent, and a rear passenger vent in a variety of different modes of operation, the modes including defrost, panel, floor, bi-level, and mixed mode, said system comprising:
   a cylindrical housing having a plurality of passageways directed to a first portion of the vehicle and a plurality of passageways directed to a second portion of the vehicle attached thereto, said cylindrical housing having an open end and a closed end;
   a blower disposed to force air into said cylindrical housing through said open end and towards said closed end;
   a first inner barrel rotatably disposed within said cylindrical housing adjacent to said open end, said first inner barrel having at least one slot formed on the outside surface thereof, said first inner barrel capable of aligning said slot with one of said plurality of passageways directed to the first portion of the vehicle, said first inner barrel including a first involute surface to direct a portion of the air flow to said at least one slot; and
   a second inner barrel rotatably disposed within said cylindrical housing independent of said first inner barrel, said second inner barrel is disposed adjacent said closed end of said cylindrical housing, said second inner barrel having at least one aperture formed on the outside surface thereof, said second inner barrel capable of aligning said aperture with one of said plurality of passageways directed to the second portion of the vehicle, said second inner barrel including a second involute surface, cooperative with said first involute surface, for directing the remaining portion of the air flow to said aperture, whereby the first portion of the vehicle may experience a first mode of operation and another portion of the vehicle may experience a second mode of operation independent of said first mode.

14. The air distribution system as set forth in claim 13, wherein said first involute surface is curved in a positive parabolic manner with a first multiple.

15. The air distribution system as set forth in claim 14, wherein said second involute surface is curved in a positive parabolic manner with a second multiple smaller than said first multiple.

16. The air distribution system as set forth in claim 13, wherein said portion of said air flow disposed radially outward of said first involute surface is guided through said slot by said first involute surface and said remaining portion of said air flow disposed radially inward of said first involute surface is guided through said aperture by said second involute surface.

17. The air distribution system as set forth in claim 13, further comprising a first seal disposed between said outer surface of said first barrel and said cylindrical housing and second seal disposed between said outer surface of said second barrel and said cylindrical housing.

18. The air distribution system as set forth in claim 13, further comprising a first lever means to rotate said first inner barrel and a second lever means to rotate said second inner barrel.

19. The air distribution system as set forth in claim 13, further comprising: a rod coupled to said first inner barrel; a first lever attached to said rod for controlling the rotation of said first inner barrel; and a second lever attached to said second inner barrel for controlling the rotation thereof.

20. The fluid distribution system as set forth in claim 19, wherein said rod extends through a bore formed in the second inner barrel.

* * * * *